US011475167B2

(12) United States Patent
Buendgen et al.

(10) Patent No.: US 11,475,167 B2
(45) Date of Patent: Oct. 18, 2022

(54) RESERVING ONE OR MORE SECURITY MODULES FOR A SECURE GUEST

(71) Applicant: INTERNATIONAL BUSINESS MACHINES CORPORATION, Armonk, NY (US)

(72) Inventors: Reinhard Theodor Buendgen, Tuebingen (DE); Volker Urban, Boeblingen (DE); Richard Victor Kisley, Charlotte, NC (US); Jonathan D. Bradbury, Poughkeepsie, NY (US); Torsten Hendel, Boeblingen (DE); Harald Freudenberger, Fellbach (DE); Benedikt Klotz, Ehningen (DE); Klaus Werner, Moetzingen (DE); Markus Selve, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 305 days.

(21) Appl. No.: 16/775,887

(22) Filed: Jan. 29, 2020

(65) Prior Publication Data

US 2021/0232709 A1 Jul. 29, 2021

(51) Int. Cl.
G06F 9/455 (2018.01)
G06F 21/72 (2013.01)
G06F 21/60 (2013.01)

(52) U.S. Cl.
CPC .......... *G06F 21/72* (2013.01); *G06F 9/45558* (2013.01); *G06F 21/606* (2013.01); *G06F 2009/45587* (2013.01)

(58) Field of Classification Search
CPC .... G06F 21/72; G06F 21/606; G06F 9/45558; G06F 2009/45587
See application file for complete search history.

(56) References Cited

U.S. PATENT DOCUMENTS

| 4,494,189 | A | 1/1985 | Bean et al. |
| 5,535,416 | A | 7/1996 | Feeney et al. |
| 6,363,480 | B1 | 3/2002 | Perlman |
| 6,453,392 | B1 | 9/2002 | Flynn, Jr. et al. |
| 7,424,543 | B2 | 9/2008 | Rice, III |
| 7,639,819 | B2 | 12/2009 | Ho et al. |

(Continued)

FOREIGN PATENT DOCUMENTS

| CN | 103378971 A | 10/2013 |
| CN | 193563294 A | 2/2014 |

(Continued)

OTHER PUBLICATIONS

International Search Report and Written Opinion, PCT/IB2020/061735, dated Mar. 23, 2021, pp. 1-8.

(Continued)

*Primary Examiner* — Matthew T Henning
(74) *Attorney, Agent, or Firm* — Edward J. Wixted, III, Esq.; Blanche E. Schiller, Esq.; Heslin Rothenberg Farley & Mesiti P.C.

(57) ABSTRACT

A security module, such as a cryptographic adapter, is reserved for a secure guest of a computing environment. The reserving includes binding one or more queues of the security module to the secure guest. The one or more queues are then managed based on one or more actions relating to the reservation.

20 Claims, 10 Drawing Sheets

(56) References Cited

U.S. PATENT DOCUMENTS

| | | | |
|---|---|---|---|
| 8,826,039 | B2 | 9/2014 | Chou et al. |
| 8,891,868 | B1 | 11/2014 | Volodymyr |
| 9,038,148 | B1 | 5/2015 | Roth |
| 9,288,214 | B2 | 3/2016 | Chang |
| 9,418,229 | B2 | 8/2016 | Lau |
| 9,525,752 | B2 | 12/2016 | Pennington |
| 9,578,017 | B2 | 2/2017 | Ferguson et al. |
| 9,734,355 | B2 | 8/2017 | Oxford |
| 9,858,140 | B2 | 1/2018 | Gabor |
| 10,229,672 | B1 | 3/2019 | Rao |
| 10,284,534 | B1 | 5/2019 | Perlman et al. |
| 10,461,943 | B1 | 10/2019 | Nun |
| 2003/0217258 | A1 | 11/2003 | Bade |
| 2007/0050763 | A1* | 3/2007 | Kagan ............... G06F 13/12 718/1 |
| 2009/0089815 | A1* | 4/2009 | Manczak ........... G06F 9/45533 719/327 |
| 2009/0110191 | A1 | 4/2009 | Sanvido et al. |
| 2012/0054486 | A1 | 3/2012 | Lakkavalli |
| 2012/0110337 | A1 | 5/2012 | Murphey |
| 2012/0179909 | A1 | 7/2012 | Sagi et al. |
| 2013/0031538 | A1 | 1/2013 | Skalsky |
| 2013/0104124 | A1* | 4/2013 | Tsirkin ............... G06F 9/45558 718/1 |
| 2015/0178504 | A1 | 6/2015 | Nystrom |
| 2016/0092687 | A1 | 3/2016 | Boenisch et al. |
| 2016/0261592 | A1 | 4/2016 | Laurent |
| 2016/0148001 | A1 | 5/2016 | Bacher |
| 2016/0149877 | A1 | 5/2016 | Kancharla |
| 2016/0224248 | A1* | 8/2016 | Choi ................ G06F 9/45558 |
| 2016/0241393 | A1 | 8/2016 | Boenisch et al. |
| 2016/0328335 | A1 | 11/2016 | Bhattacharyya |
| 2017/0011738 | A1 | 1/2017 | Senior |
| 2017/0249157 | A1 | 8/2017 | Bayer |
| 2018/0004539 | A1* | 1/2018 | Liguori ............... G06F 9/4406 |
| 2018/0007040 | A1 | 1/2018 | Thom |
| 2018/0019979 | A1 | 1/2018 | Bacher |
| 2018/0075259 | A1 | 3/2018 | Manapragada et al. |
| 2018/0233130 | A1 | 8/2018 | Kaskari |
| 2018/0239892 | A1 | 8/2018 | Bish |
| 2018/0253648 | A1 | 9/2018 | Kaskari |
| 2018/0254039 | A1 | 9/2018 | Qian |
| 2018/0293406 | A1 | 10/2018 | Boehl |
| 2018/0332011 | A1 | 11/2018 | Gray |
| 2019/0207764 | A1 | 7/2019 | Maximov |
| 2019/0279614 | A1 | 9/2019 | Ye |
| 2019/0391927 | A1* | 12/2019 | Tsirkin ............... G06F 12/109 |
| 2020/0125951 | A1 | 4/2020 | Mosayyebpour |
| 2020/0126556 | A1 | 4/2020 | Mosayyebpour |
| 2020/0219468 | A1 | 7/2020 | Fu |
| 2020/0285746 | A1 | 9/2020 | Buendgen |
| 2020/0285748 | A1 | 9/2020 | Buendgen |
| 2021/0167962 | A1 | 6/2021 | Wang |
| 2021/0234681 | A1* | 7/2021 | Buendgen ............ G06F 21/602 |

FOREIGN PATENT DOCUMENTS

| | | | |
|---|---|---|---|
| EP | 2280502 | A1 | 2/2011 |
| EP | 3140770 | A1 | 3/2017 |
| TW | 201214139 | A | 4/2012 |
| TW | 201635185 | A | 10/2016 |
| TW | M540310 | U | 4/2017 |
| WO | WO2015161478 | A1 | 11/2015 |
| WO | WO2018111979 | | 6/2018 |
| WO | WO2018218349 | A1 | 12/2018 |

OTHER PUBLICATIONS

Fisher-Ogden, John, "Hardware Support for Efficient Virtualization," University of California, San Diego, Tech. Rep. 12, 2006 (no further date information available), pp. 1-12.

Gum, P.H., "System/370 Extended Architecture: Facilities for Virtual Machines," IBM J. Res. Develop., vol. 27, No. 6, Nov. 1983, pp. 530-544.

Hughes, James et al., "Transparent Multi-core Cryptographic Support on Niagara CMT Processors," Second International Workshop on Multicore Software Engineering, May 2009, pp. 1-8.

Ibm, "z/ Architecture—Principles of Operation," IBM Publication No. SA22-7832-11, Twelfth Edition, Sep. 2017, pp. 1-1902.

Klimm, Alexander et al., "An Adaptive and Scalable Multiprocessor System For Xilinx FPGAs Using Minimal Sized Processor Cores," 2008 IEEE International Symposium on Parallel and Distributed Processing, Apr. 2008, pp. 1-7.

Lal, Shankar et al., "Securing VNF Communication in NFVI," 2017 IEEE Conference on Standards for Communications and Networking (CSCN), Sep. 2017, pp. 187-192.

Le Vinh, Thinh et al., "Trusted Platforms to Secure Mobile Cloud Computing," 2014 IEEE International Conference on High Performance Computing and Commumcations, 2014 IEEE 6th International Symposirum on Cyberspace Safety and Security, 2014 IEEE 11th International.

Mell, Peter and Tim Grance, "The NIST Definition of Cloud Computing," National Institute of Standards and Technology, Information Technology Laboratory, Special Publication 800-145, Sep. 2011, pp. 1-7.

Smith et al., "Validating a High-Performance, Programmable Secure Coprocessor", Secure Systems and Smart cards, IBM T.J. Watson Research Center, New York, Oct. 1999, 11 pages.

Yuan, Z. et al., "An improved hybrid CTC-Attention model for speech recognition," Oct. 2018, pp. 1-5.

Chiu, C. et al., "Montonic Chunkwise Attention," Dec. 2017, pp. 1-16.

Raffel, C. et al., "Online and linear-time attention by enforcing monotonic alignments," Jun. 2017, pp. 1-19.

Fan, R. et al., "An online attention-based model tor speech recognition", Nov. 2018, 5 pages.

Tikhvinskiy, et al., "QoS Requirements as Factor of Trust to 5G Network," Journal of Telecommunication and Information Technology, Jan. 2016, 6 pages.

International Search Report of International Application No. PCT/EP2020055098, dated May 7, 2020, 4 pages.

International Search Report of International Application No. PCT/EP2020055155, dated Jun. 9, 2020, 5 pages.

Australian Examination Report No. 1 for Standard Patent Application, Application No. 2020234675, dated Jan. 19, 2022, 3 pages.

International Search Report of International Application No. PCT/EP/2020/055160, dated Apr. 7, 2020, 4 pages.

* cited by examiner

RESERVING ONE OR MORE SECURITY MODULES FOR A SECURE GUEST

BACKGROUND

One or more aspects relate, in general, to processing within a computing environment, and in particular, to protecting data within such an environment.

In computing environments, cryptographic elements are useful technological components in protecting data. Information may be stored or transmitted in a cryptographically secured form in order to avoid unauthorized access to the information stored or transmitted. In some cases, software-based techniques may be used to perform such data protection; in other cases, hardware support and security specific elements may be used. These specific elements may be named hardware security modules (HSMs) which may be used as part of a computer or an information transmission system of a computing environment.

A hardware security module may include specific circuitries to provide functions for data encryption and data decryption. The functions may also include generating and storing cryptographic keys for use of guest systems, also referred to as guests. Various guests (e.g., virtual machines, virtual servers, etc.) are controlled by a hypervisor or virtual machine manager. Different guests managed by a common hypervisor can be generated by different owners. A traditional hypervisor has full control over the guests it hosts. In particular, the hypervisor has the capability to inspect and even modify memory of the hosted guest. In a cloud environment, the hypervisor and its administrators are to be fully trustworthy.

Some guests managed by a hypervisor are secure guests. A secure guest is a guest that can be hosted by one or more hypervisors that are not fully trustworthy. The image of such a guest would be protected when loaded and the protection of the contents of the resources assigned to the guest (e.g., memory, central processing unit (CPU) registers, etc.) would be maintained throughout the lifetime of the guest. The protection of the guest includes at least integrity protection (e.g., hypervisor cannot maliciously change any guest states) and in addition can include maintaining the confidentiality of the initial image, code and data running in the guest. Examples of environments that support secure guests include AMD SEV (Advanced Micro Devices Secure Encrypted Virtualization) and POWER® protected computation. POWER is a trademark or registered trademark of International Business Machines Corporation in at least one jurisdiction.

SUMMARY

Shortcomings of the prior art are overcome and additional advantages are provided through the provision of a computer program product for facilitating processing within a computing environment. The computer program product includes at least one computer readable storage medium readable by at least one processing circuit and storing instructions for performing a method. The method includes reserving a security module for a secure guest of the computing environment. The reserving provides a reservation and includes binding one or more queues used to communicate with the security module to the secure guest. The one or more queues are managed based on one or more actions relating to the reservation.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

In accordance with one or more aspects, a capability is provided to reserve one or more security modules for a guest (e.g., a secure guest). In one example, a security module is a hardware security module (HSM), which is, for instance, a pluggable component or an individually connected component to a computer system. As one particular example, the hardware security module is a cryptographic card or cryptographic adapter (also referred to as a crypto adapter); however, other examples exist. In one embodiment, a crypto adapter (or other security module) is reserved for exclusive use by a secure guest, if, for instance, the crypto adapter is in a list of accessible crypto adapters included in the metadata used to start the secure guest and if the crypto adapter is not reserved by another secure guest.

One embodiment of a computing environment to incorporate and use one or more aspects of the present invention is described with reference to FIG. 1A. In one example, the computing environment is based on the z/Architecture hardware architecture, offered by International Business Machines Corporation, Armonk, N.Y. One embodiment of the z/Architecture hardware architecture is described in "z/Architecture Principles of Operation," IBM Publication No. SA22-7832-11, Twelfth Edition, September 2017, which is hereby incorporated herein by reference in its entirety. IBM and z/Architecture are registered trademarks or trademarks of International Business Machines Corporation in at least one jurisdiction.

The computing environment may also be based on other architectures; the z/Architecture hardware architecture is only one example.

Figure 1A:
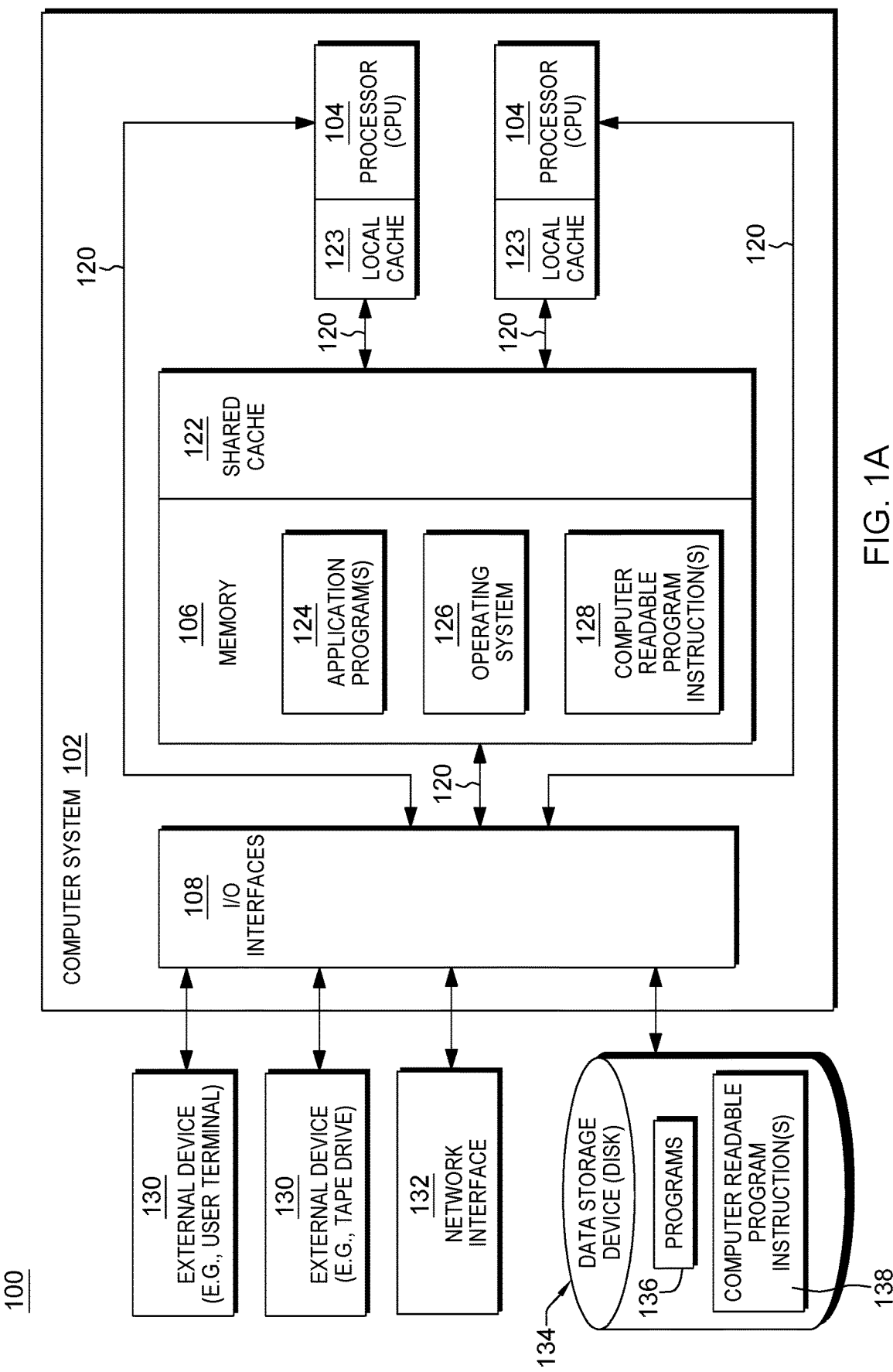
FIG. 1A depicts one example of a computing environment to incorporate and use one or more aspects of the present invention.

As shown in FIG. 1A, a computing environment 100 includes, for instance, a computer system 102 shown, e.g., in the form of a general-purpose computing device. Computer system 102 may include, but is not limited to, one or more processors or processing units 104 (e.g., central processing units (CPUs)), a memory 106 (a.k.a., system memory, main memory, main storage, central storage or storage, as examples), and one or more input/output (I/O) interfaces 108, coupled to one another via one or more buses and/or other connections 120.

Bus 120 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 106 may include, for instance, a cache, such as a shared cache 122, which may be coupled to local caches 123 of processors 104. Further, memory 106 may include one or more programs or applications 124, an operating system 126, and one or more computer readable program instructions 128. Computer readable program instructions 128 may be configured to carry out functions of embodiments of aspects of the invention.

Computer system 102 may also communicate via, e.g., I/O interfaces 108 with one or more external devices 130, one or more network interfaces 132, and/or one or more data storage devices 134. Example external devices include a user terminal, a tape drive, a pointing device, a display, etc. Network interface 132 enables computer system 102 to communicate with one or more networks, such as a local area network (LAN), a general wide area network (WAN), and/or a public network (e.g., the Internet), providing communication with other computing devices or systems.

Data storage device 134 may store one or more programs 136, one or more computer readable program instructions 138, and/or data, etc. The computer readable program instructions may be configured to carry out functions of embodiments of aspects of the invention.

Computer system 102 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 102. Examples, include, but are not limited to: microcode, device drivers, redundant processing units, external disk drive arrays, RAID systems, tape drives, and data archival storage systems, etc.

Computer system 102 may be operational with numerous other general-purpose or special-purpose computing system environments or configurations. Examples of well-known computing systems, environments, and/or configurations that may be suitable for use with computer system 102 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 1B:
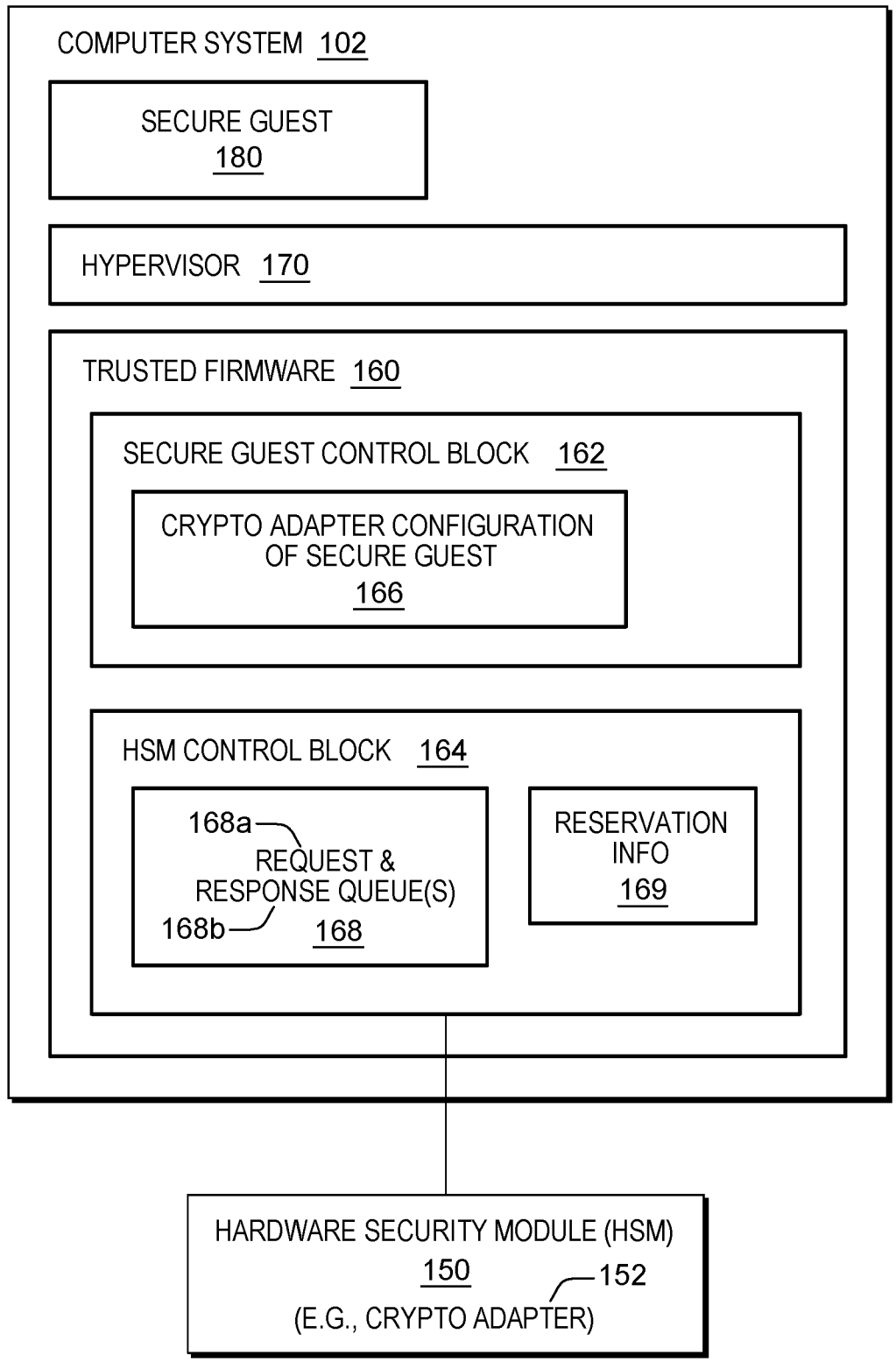
FIG. 1B depicts further details of the computing environment of FIG. 1A, in accordance with one or more aspects of the present invention.

Further details of one embodiment of a computing environment (e.g., computing environment 100) to incorporate and/or use one or more aspects of the present invention are described with reference to FIG. 1B. In one example, computing environment 100 is a shared computing environment that includes a system, such as computer system 102, and a security module, such as a hardware security module (HSM) 150. In the examples herein, the security module is a hardware security module, and in one particular example, a crypto adapter 152; however, in other embodiments, other security modules may be used.

Computer system 102 includes, in one example, a trusted component, such as trusted firmware 160, and a hypervisor 170 that interacts with one or more guests (e.g., virtual machines (VMs)), including one or more secure guests 180. Firmware (e.g., trusted firmware 160) includes, e.g., the microcode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

The hypervisor (e.g., hypervisor 170) is sometimes referred to as a host. One example of hypervisor 170 is the z/VM hypervisor, offered by International Business Machines Corporation, Armonk, N.Y. z/VM is a registered trademark or trademark of International Business Machines Corporation in at least one jurisdiction. The hypervisor manages guests executing within the computer system.

A guest or guest system is, for instance, an operating system executing in a virtual machine (VM) on a hypervisor. The hypervisor is used to assign one or more specific hardware security modules (e.g., hardware security module 150) to the guest system. A specific hardware security module (e.g., hardware security module 150) assigned to the guest may be configured with a cryptographic master key (a.k.a., master key or wrapping-key) used to wrap a key of the guest to provide a secure key for the guest.

One or more of the guests are considered secure guests (e.g., secure guest 180). A secure guest is a guest whose state and memory are protected from hypervisor access. A secure guest is started using e.g., metadata that is transmitted to the trusted component (e.g., trusted firmware 160) in a confidentiality protecting and integrity protecting manner.

In one example, trusted firmware 160 includes a plurality of control blocks, including, for instance, a secure guest control block 162 and a security module control block, such as a hardware security module control block 164. Secure guest control block 162 includes configuration information, for each secure guest, relating to the one or more security modules reserved for each guest. In the examples herein, the security modules that may be reserved for a guest are crypto adapters, and therefore, in one example, the configuration is referred to as a crypto adapter configuration of the secure guest 166. Secure guest control block 162 includes, in one example, a configuration 166 for each secure guest of the system. Configuration 166 for a particular secure guest includes, for instance, the list of accessible crypto adapters included in the metadata used to start the secure guest.

In one example, hardware security module control block 164 includes one or more queues 168 used by the system (e.g., computer system 102) to communicate with each crypto adapter that the system can access, as well as reservation information 169 for each crypto adapter. As an example, one or more queues 168 include at least one request queue 168a that is used to include requests to be sent to the crypto adapter assigned to the queue(s) and at least one response queue 168b to receive responses from the crypto adapter. In one example, the same queue may be used for requests and/or responses for a particular crypto adapter. Other examples are also possible.

Reservation information 169 includes, for example, an indication of whether the crypto adapter is reserved, and if so, by which guest. In one example, when a crypto adapter (or other security module) is reserved for a guest (e.g., secure guest 180), the guest has exclusive access to the crypto adapter.

In systems supporting virtualization, such as System z offered by International Business Machines Corporation (System z is a trademark or registered trademark of International Business Machines Corporation in at least one jurisdiction), the hypervisor may change the configuration of the guest at any time during the lifetime of a guest. For instance, a malicious or poorly programed hypervisor may configure the access of a crypto adapter from being first accessible by a first guest and then by a second guest. Due to the asynchronous nature of most cryptographic requests to a crypto adapter, it may therefore happen that for a request issued by a first guest the response may be accessible by a second guest. For secure guests, however, the assumption is that they securely run even though the hypervisor is not trusted; therefore, the system is to prevent a second guest access to a crypto adapter assigned to the first secure guest while the first secure guest is running or reading the results of a crypto request issued by the first secure guest to the crypto adapter. In addition, a secure guest is to be able to detect when a master key of a crypto adapter is changed while the secure guest has access to that crypto adapter.

Figure 2:
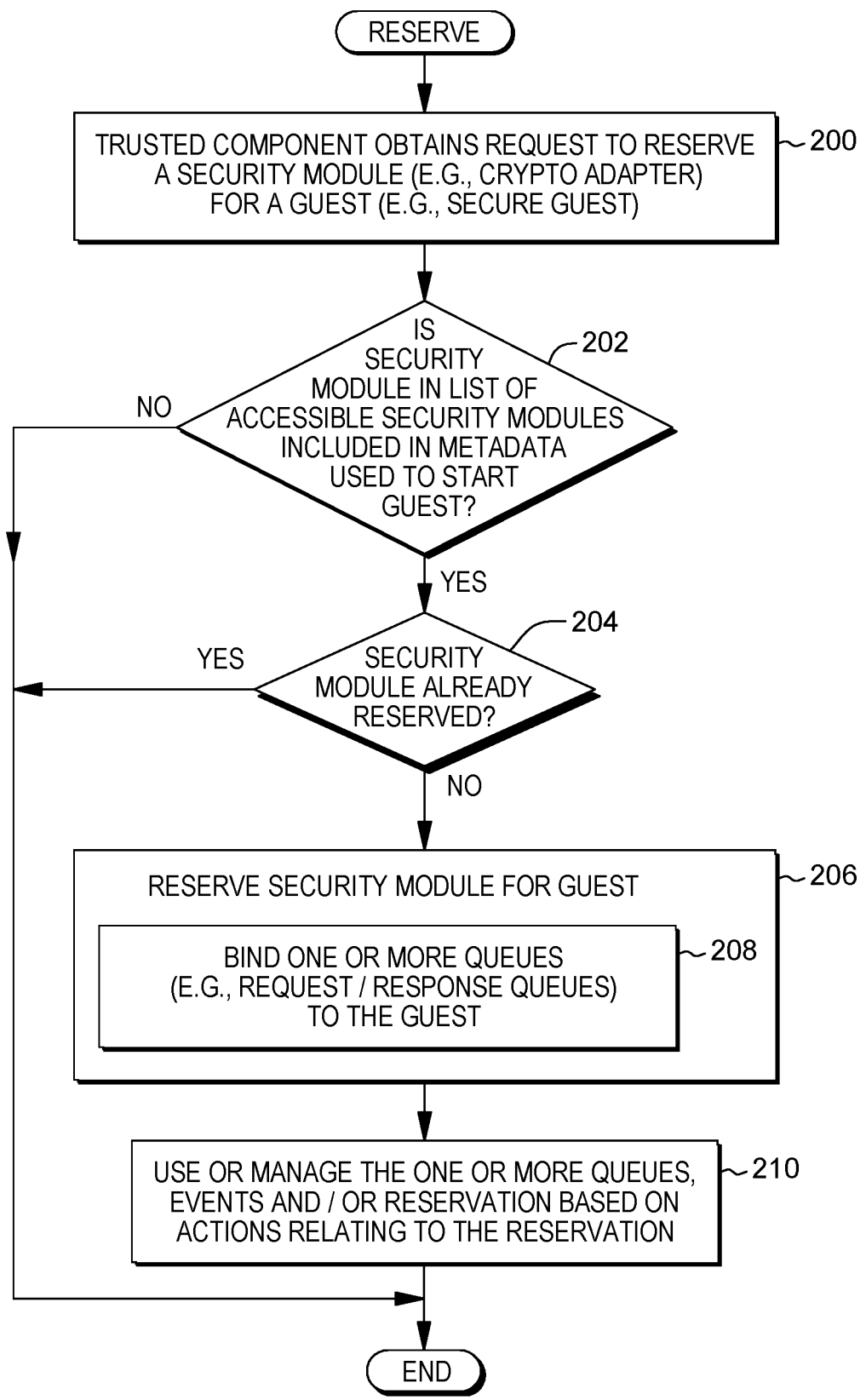
FIG. 2 depicts one example of reserving a security module (e.g., a crypto adapter) for a guest (e.g., a secure guest), in accordance with an aspect of the present invention.
Figure 3:
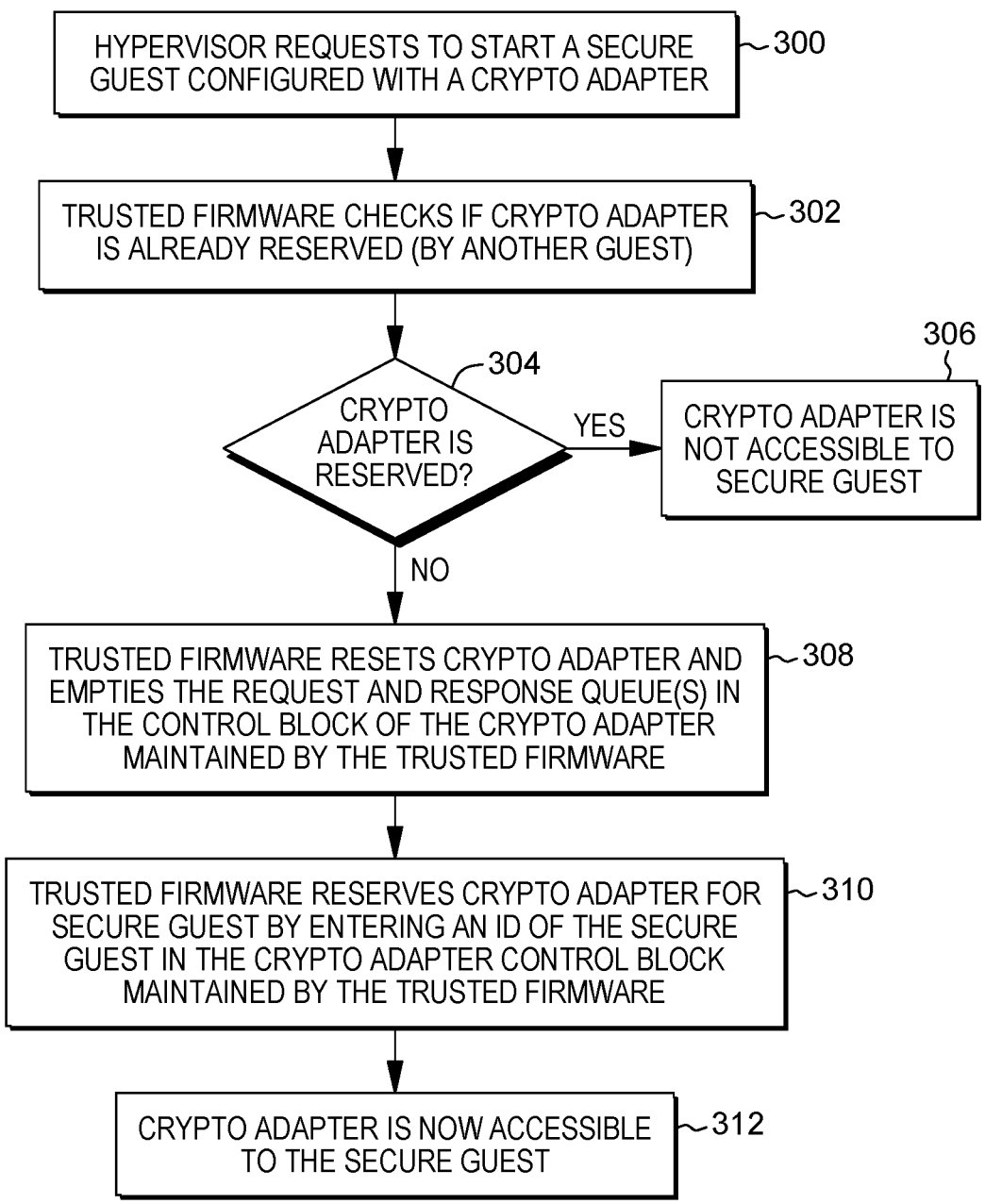
FIG. 3 depicts one example of a flow to start a guest with a crypto adapter, in accordance with one or more aspects of the present invention.
Figure 4:
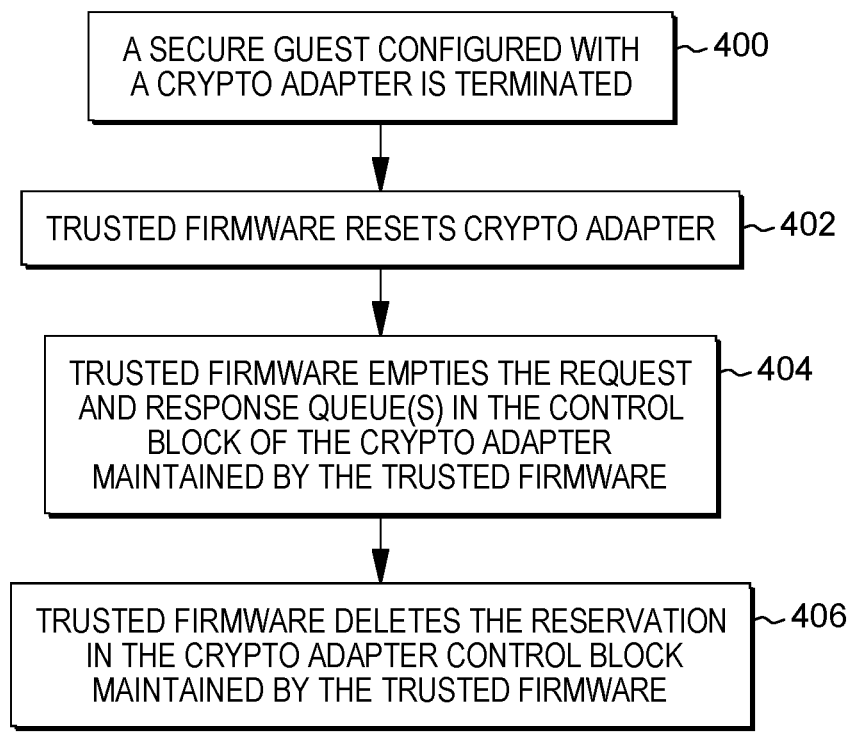
FIG. 4 depicts one example of a flow to terminate a guest with a crypto adapter, in accordance with one or more aspects of the present invention.
Figure 5:
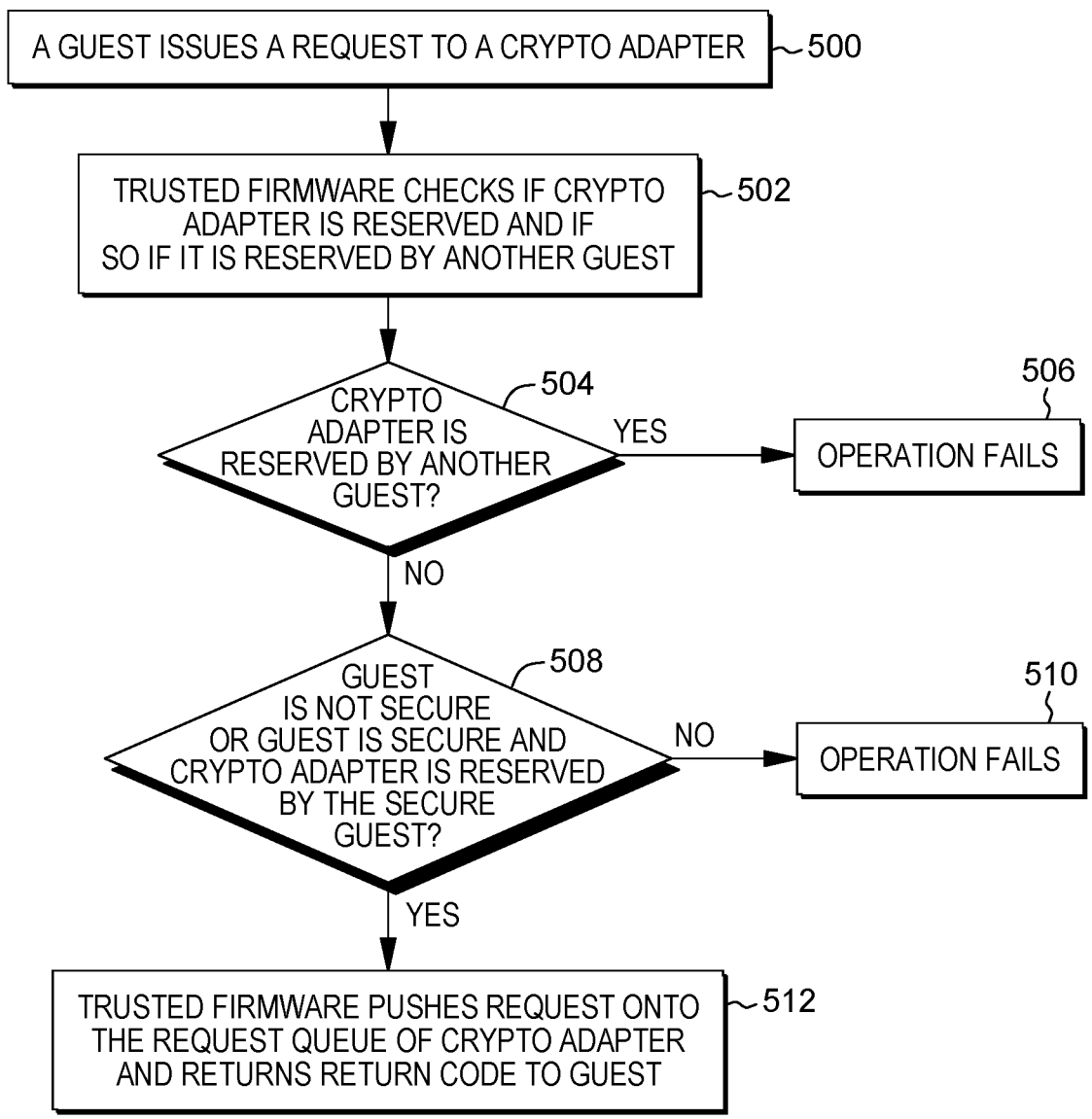
FIG. 5 depicts one example of a flow to send a request to a crypto adapter, in accordance with one or more aspects of the present invention.
Figure 6:
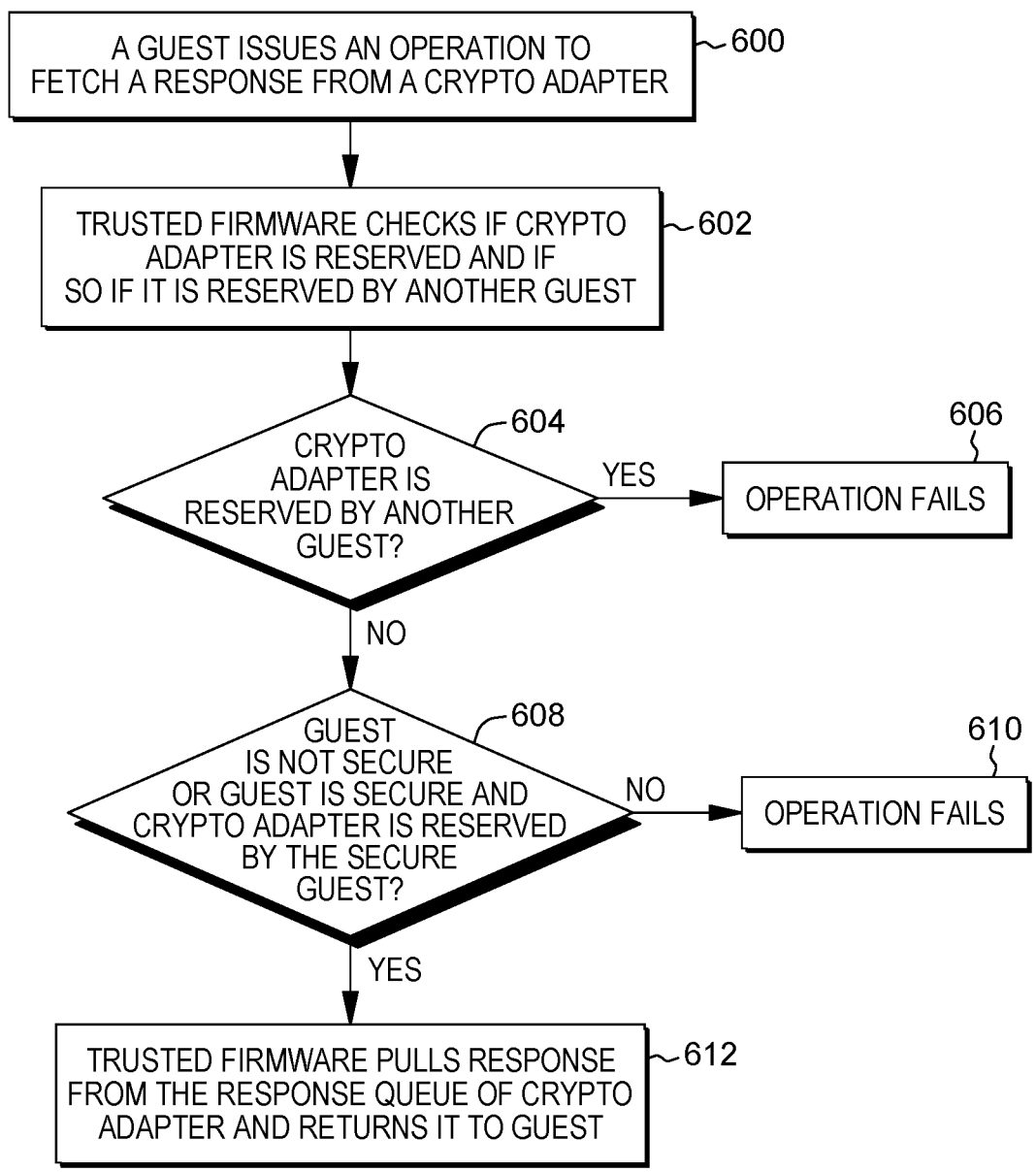
FIG. 6 depicts one example of a flow to fetch a response from a crypto adapter, in accordance with one or more aspects of the present invention.

One or more aspects of the present invention address, at the very least, the above concern of reassigning a crypto adapter at an inopportune time. In accordance with one or more aspects of the present invention, one or more crypto adapters (and/or other security modules) are reserved for a guest, such that the guest has exclusive access to the crypto adapter. Details relating to reserving a crypto adapter for a secure guest are described with reference to FIGS. 2-6. In particular, FIG. 2 depicts one example of logic to reserve a security module (e.g., a crypto adapter) for a secure guest; FIG. 3 depicts one example of logic to start a guest with a crypto adapter; FIG. 4 depicts one example of logic to terminate a guest with a crypto adapter; FIG. 5 depicts one example of logic to send a request to a crypto adapter; and FIG. 6 depicts one example of logic to fetch a response from a crypto adapter.

Initially referring to FIG. 2, to reserve a security module for a secure guest (e.g., secure guest 180), a trusted component (e.g., trusted firmware 160) obtains a request to reserve a security module (e.g., crypto adapter 152) for the secure guest, STEP 200. As examples, such a request may be obtained by the trusted component based on starting the secure guest or the request may be submitted by a secure guest when a reservation of a security module did not succeed when the secure guest was started or when the reservation of the security module is lost due to a loss (e.g., temporary loss) of the security module. Other examples are also possible.

Based on obtaining the request, a determination is made as to whether the security module is included in a list of accessible security modules included in the metadata used to start the guest, INQUIRY 202. In one embodiment, this is determined using configuration 166 for the secure guest. If the security module is not in the list, then this processing is complete and, in one embodiment, an error code is returned. The security module is not reserved for the guest. However, if the security module is in the list of accessible security modules, then a further determination is made as to whether the security module is already reserved, e.g., by another guest, INQUIRY 204. This is determined, for instance, by checking reservation information 169. If it is already reserved, e.g., by another guest, then this processing is complete and, in one embodiment, an error code is returned. However, if the security module is not already reserved, then the security module is reserved for the guest, STEP 206. The reserving includes, for instance, binding one or more queues (e.g., request queue 168a/response queue 168b) to the guest, STEP 208. The binding includes, for instance, indicating the reservation in a control block, such as in reservation information 169 of HSM control block 164.

Based on reserving the security module to the guest, one or more queues bound to the guest are used and/or managed, and/or events and/or the reservation itself are managed based on actions relating to the reservation, STEP 210. For instance, an action may include an operation to submit a request to a queue, and the managing may include confirming that the security module is reserved to the secure guest and permitting the operation based on confirming the security module is reserved to the secure guest and that the request was issued by the secure guest; and/or the action may include an operation to fetch a response from a queue, and the managing may include confirming that the security module is reserved to the secure guest and permitting the operation based on confirming the security module is reserved to the secure guest and that the operation to fetch was issued by the secure guest. Yet further, an action may include losing access to the security module and the managing may include flushing the one or more queues. As a further example, an action may include termination of the secure guest, and the managing may include deleting one or more pending requests from the one or more queues. Moreover, as examples, the sending of a request from a secure guest to a queue that is not reserved for the secure guest is denied; a pass of a response to a secure guest that was fetched from a queue not reserved for the secure guest is denied; and/or an error code is returned to a secure guest if the secure guest attempts to access a queue that is not reserved for the secure guest. Many other actions, events and/or managing may be performed. Further, as indicated herein, although the examples refer to a crypto adapter, the logic applies equally to other security modules.

Further details relating to reserving a security module to a secure guest are described with reference to FIGS. 3-6.

Referring to FIG. 3, one embodiment of starting a guest (e.g., secure guest 180) with a crypto adapter (e.g., crypto adapter 152) is described. Initially, a hypervisor (e.g., hypervisor 170) requests to start a secure guest (e.g., secure guest 180) that is to be configured with a crypto adapter (e.g., crypto adapter 152, or other security module), STEP 300. A trusted component (e.g., trusted firmware 160) receives the request and checks whether the crypto adapter is already reserved by, for instance, another guest, STEP 302. This includes, for instance, checking reservation information 169. If the crypto adapter is reserved, INQUIRY 304, then the crypto adapter is not accessible to the secure guest, and therefore, the guest is not started with the crypto adapter, STEP 306. In this instance, another request may be issued to start the guest with another crypto adapter (or other security module) or one request may include multiple crypto adapters (and/or other security modules) and the processing can repeat until it is successful in starting the guest with a crypto adapter or there are no other crypto adapters (or other security modules) included in the request.

Returning to INQUIRY 304, if the crypto adapter is not reserved by, e.g., another guest, in one example, trusted firmware 160 resets the crypto adapter. Resetting the crypto adapter includes, for instance, emptying the request and response queue(s) (e.g., request and response queue(s) 168) in the control block of the crypto adapter maintained by trusted firmware 160 (e.g., HSM control block 164), STEP 308. By emptying the request queues, pending requests (e.g., all pending requests) to the adapter and their associated data and pending responses (e.g., all pending responses) from the adapter and their associated data are deleted. In one example, the emptying of the queues is performed subsequent to determining there is data to be emptied. In another example, an emptying or clearing operation is performed regardless of whether there is data in the queue(s) to be cleared.

Further, trusted firmware 160 reserves the crypto adapter for the secure guest, STEP 310. In one example, this includes entering an identifier of the secure guest in, e.g., reservation information 169 of HSM control block 164 maintained by the trusted firmware, STEP 310. In other embodiments, different and/or other types of indications in the same and/or different locations may be provided. The crypto adapter is now accessible to the secure guest, STEP 312.

In another aspect, the reservation of the crypto adapter to a secure guest may be terminated, as further described with reference to FIG. 4. In one example, the secure guest configured to the crypto adapter is terminated, STEP 400. Therefore, trusted firmware 160 resets the crypto adapter, STEP 402, including, for instance, emptying the request and response queue(s) in the control block (e.g., request and response queue(s) 168) maintained by trusted firmware 160, STEP 404.

Additionally, in one embodiment, trusted firmware 160 deletes the reservation in the trusted firmware control block (e.g., reservation information 169) maintained by the trusted firmware, STEP 406. Other and/or different indications in the same and/or different locations may also be deleted, in other embodiments.

In another embodiment, the termination of the reservation can occur even if the secure guest is not terminated. Other variations are also possible.

One embodiment of sending a request from a guest to a crypto adapter is described with reference to FIG. 5. Initially, a guest (e.g., secure guest 180) sends a request to a crypto adapter (e.g., crypto adapter 152), STEP 500. The request may be a request to encrypt or decrypt data, generate a key for cryptographic operations, etc.

Based on issuing the request, the trusted component (e.g., trusted firmware 160) intercepts the request and checks whether the crypto adapter is reserved and if so whether it is reserved by another guest, STEP 502. In one example, this check is of reservation information 169. If the crypto adapter is reserved by another guest, INQUIRY 504, then the operation fails, STEP 506. However, if the crypto adapter is not reserved by another guest, then a check is made as to whether the guest is not a secure guest or whether if the guest is a secure guest is the crypto adapter reserved by the secure guest issuing the request, INQUIRY 508. Again, in one example, to check whether the crypto adapter is reserved by the secure guest, reservation information 169 is checked. Further, in one example, to check whether the guest is a secure guest, the firmware (e.g., trusted firmware 160) checks a control block maintained for the guest that includes an indication of whether the guest is secure. If the guest is a secure guest and the crypto adapter is not reserved by the secure guest, then the operation fails, STEP 510. Further, if the crypto adapter is not reserved by the other guest, INQUIRY 504, and either the guest is not a secure guest or the guest is a secure guest and the crypto adapter is reserved by the secure guest, INQUIRY 508, then the trusted firmware pushes the request onto the request queue of the crypto adapter (e.g., request queue 168a) and, in one example, returns a return code to the secure guest indicating a successful operation, STEP 512.

One embodiment of fetching a response from a crypto adapter is described with reference to FIG. 6. Initially, a guest (e.g., secure guest 180) issues an operation to fetch a response from a crypto adapter, STEP 600. Based on issuing the operation, the trusted firmware (e.g., trusted firmware 160) intercepts the operation and checks whether the crypto adapter is reserved and if so whether it is reserved by another guest, STEP 602. In one example, this check is of reservation information 169. If the crypto adapter is reserved by another guest, INQUIRY 604, then the operation fails, STEP 606. However, if the crypto adapter is not reserved by another guest, then a check is made as to whether the guest is not a secure guest or whether if the guest is a secure guest is the crypto adapter reserved by the secure guest issuing the operation, INQUIRY 608. Again, in one example, the check of whether the crypto adapter is reserved by the secure guest is of reservation information 169. Further, in one example, to check whether the guest is a secure guest, the firmware (e.g., trusted firmware 160) checks a control block maintained for the guest that includes an indication of whether the guest is secure. If the guest is a secure guest and the crypto adapter is not reserved by the secure guest, then the operation fails, STEP 610. Further, if the crypto adapter is not reserved by the other guest, INQUIRY 604, and either the guest is not a secure guest or the guest is a secure guest and the crypto adapter is reserved by the secure guest, INQUIRY 608, then the trusted firmware pulls the response from the response queue of the crypto adapter (e.g., response queue 168b) and returns it to the secure guest, STEP 612.

Described herein is a capability to reserve a security module, such as a hardware security module and in particular, a crypto adapter, for a particular guest. In one embodiment, a crypto adapter is reserved for exclusive use by a secure guest if the crypto adapter is in a list of accessible crypto adapters included in the metadata used to start the secure guest and is not reserved by another secure guest. That metadata is to be cryptographically linked to the boot image of the secure guest and transmitted to the trusted firmware via a secure channel.

The reservation is performed by the trusted firmware when the secure guest is started by indicating the reservation in the control block in the trusted firmware that the system uses in communication with the crypto adapter to queue requests to the crypto adapter and responses from the crypto adapter (e.g., HSM control block 164). The reservation may be for the life-time of the guest, and the reservation is protected from the hypervisor. The I/O configuration of the guest, including the reservation(s), is protected from mis-configurations of a hypervisor(s), including a non-cooperating hypervisor.

In one example, if a reservation of a crypto adapter fails when a secure guest is started or when a reservation is undone due to an adapter being unplugged (and replugged), then the system may provide an option to, e.g., all the secure guests to request from the trusted firmware the reservation of an adapter. In which case, the trusted firmware checks whether the adapter is available, whether the secure guest may access the adapter according to the metadata of the secure guest and whether there is no conflicting reservation of the adapter and in the positive cases, reserves the adapter for the secure guest.

In one aspect, trusted firmware maintains a control block that is inaccessible by the hypervisor and which represents the secure guest for the lifetime of the guest, and includes data from the metadata of the secure guest (e.g., secure guest control block 162). The trusted firmware maintains the reservation of crypto adapters until the secure guest is terminated. Thus, the hypervisor cannot interfere with a reservation maintained for a running guest by the trusted firmware. The trusted firmware rejects any requests from a secure guest that are not directed to a crypto adapter reserved for that guest and any requests by an arbitrary guest to a crypto adapter reserved for another guest.

If the system detects that the crypto adapter is unplugged, then the system will undo any reservation of that crypto adapter, in one embodiment.

For each crypto adapter that the system can access, the trusted firmware maintains a control block (e.g., control block 164), which in one example, includes at least a queue of requests including an indication of whether a queue entry is yet to be submitted to the crypto adapter or a response from a crypto adapter. Each such control block also maintains an indication of whether its crypto adapter is reserved and if so by which guest it is reserved.

The crypto adapter control blocks (and the reservation indication) are not accessible by hypervisors or guests directly. In one example, they can only be accessed by firmware on behalf of the hypervisor or the guests.

At system start-up, in one embodiment, all crypto adapters are marked as being not reserved.

In one or more aspect, the trusted firmware starts a secure guest, then, in one embodiment, it reserves the crypto adapters that are defined both in the guest configuration of the hypervisor and the crypto adapter list in the metadata of the secure guest. The reservation succeeds for all unreserved crypto adapters and it fails for all reserved crypto adapters. The trusted firmware configures the secure guest such that reserved crypto adapters can be accessed from the guest in hypervisor pass-through mode and an attempt to access an adapter not reserved for the secure guest fails. In one example, a hardware security module is configured to the secure guest in hypervisor pass-through mode, such that cryptographic operations issued by a guest are not intercepted by a hypervisor (e.g., hypervisor 170). Instead, they are intercepted by a trusted component (e.g., trusted firmware 160), bypassing the hypervisor. This configuration is performed in one example of the z/Architecture hardware architecture by configuring, e.g., a crypto control block of, e.g., a start interpretative execution (SIE) instruction of the z/Architecture hardware architecture.

In one or more aspects, the firmware managing the crypto adapter control block checks the ID of the requesting guest if a request shall be pushed to the request queue of a reserved hardware security module and rejects the operation if the ID does not match the ID of the guest owning the reservation. The firmware managing the crypto adapter control block checks the ID of the requesting guest if a response shall be pulled from the request queue of a reserved crypto adapter and rejects the operation if the ID does not match the ID of the guest owning the reservation.

In one or more aspects, if a trusted firmware terminates a secure guest, then for, e.g., all crypto adapters reserved for the secure guest it indicates to the crypto adapters to stop any pending requests and flushes the request and response queues of the crypto adapters.

In one or more aspects, if a reserved crypto adapter that functions as a hardware security module (HSM) is lost and reappears, the trusted firmware ensures that the crypto adapter does not operate on any pending requests, flushes its request and response queues and deconfigures the HSM from the secure guest or puts it in a state where each request by the secure guest to that adapter results in an error.

In one or more aspects, the trusted firmware provides an interface accessible, e.g., by secure guests only, which the secure guests can use to request that a lost reservation be reestablished. The hypervisor fulfills a request to reestablish a reservation, e.g., only for crypto adapters that are both in the hypervisor configuration of the secure guest and the list of crypto adapters in the metadata of the secure guest.

In one embodiment, to ensure that a master key of the HSM is the master key belonging a secure guest, a secure guest is to check a master key verification pattern before it uses an adapter for the first time or whenever a reservation of a lost adapter is reestablished.

Various aspects are described herein. Many variations and embodiments are possible without departing from a spirit of aspects of the present invention. It should be noted that, unless otherwise inconsistent, each aspect or feature described herein, and variants thereof, may be combinable with any other aspect or feature.

One or more aspects of the present invention are inextricably tied to computer technology and facilitate processing within a computer, improving performance thereof. Embodiments of the present invention are inextricably tied to computing at least because they are directed to addressing an issue that is unique to computing and providing a technical approach that is also within this sphere. Embodiments of the present invention reserve a security module, such as a crypto adapter, for a particular guest. Given that both the issue and the approach are specific to computing, embodiments of the present invention are inextricably tied to computing.

Figure 7A:
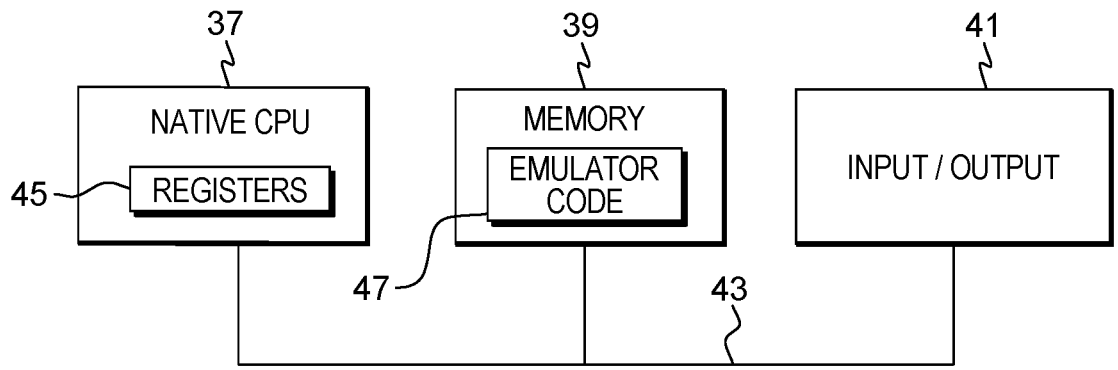
FIG. 7A depicts another example of a computing environment to incorporate and use one or more aspects of the present invention.

Other types of computing environments may also incorporate and use one or more aspects of the present invention, including, but not limited to, emulation environments, an example of which is described with reference to FIG. 7A. In this example, a computing environment 35 includes, for instance, a native central processing unit (CPU) 37, a memory 39, and one or more input/output devices and/or interfaces 41 coupled to one another via, for example, one or more buses 43 and/or other connections. As examples, computing environment 35 may include a PowerPC® processor offered by International Business Machines Corporation, Armonk, N.Y.; and/or other machines based on architectures offered by International Business Machines Corporation, Intel Corporation, or other companies. PowerPC is a trademark or registered trademark of International Business Machines Corporation in at least one jurisdiction.

Intel is a trademark or registered trademark of Intel Corporation or its subsidiaries in the United States and other countries.

Native central processing unit 37 includes one or more native registers 45, such as one or more general purpose registers and/or one or more special purpose registers used during processing within the environment. These registers include information that represents the state of the environment at any particular point in time.

Moreover, native central processing unit 37 executes instructions and code that are stored in memory 39. In one particular example, the central processing unit executes emulator code 47 stored in memory 39. This code enables the computing environment configured in one architecture to emulate another architecture. For instance, emulator code 47 allows machines based on architectures other than the z/Architecture hardware architecture, such as PowerPC processors, or other servers or processors, to emulate the z/Architecture hardware architecture and to execute software and instructions developed based on the z/Architecture hardware architecture.

Figure 7B:
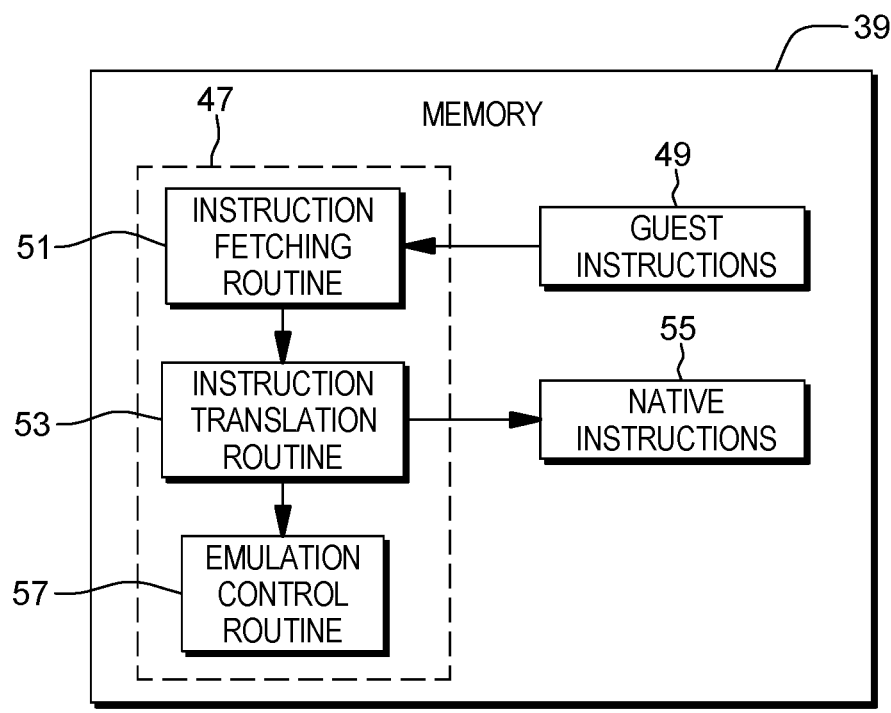
FIG. 7B depicts further details of the memory of FIG. 7A.

Further details relating to emulator code 47 are described with reference to FIG. 7B. Guest instructions 49 stored in memory 39 comprise software instructions (e.g., correlating to machine instructions) that were developed to be executed in an architecture other than that of native CPU 37. For example, guest instructions 49 may have been designed to execute on a z/Architecture processor, but instead, are being emulated on native CPU 37, which may be, for example, an Intel processor. In one example, emulator code 47 includes an instruction fetching routine 51 to obtain one or more guest instructions 49 from memory 39, and to optionally provide local buffering for the instructions obtained. It also includes an instruction translation routine 53 to determine the type of guest instruction that has been obtained and to translate the guest instruction into one or more corresponding native instructions 55. This translation includes, for instance, identifying the function to be performed by the guest instruction and choosing the native instruction(s) to perform that function.

Further, emulator code 47 includes an emulation control routine 57 to cause the native instructions to be executed. Emulation control routine 57 may cause native CPU 37 to execute a routine of native instructions that emulate one or more previously obtained guest instructions and, at the conclusion of such execution, return control to the instruction fetch routine to emulate the obtaining of the next guest instruction or a group of guest instructions. Execution of native instructions 55 may include loading data into a register from memory 39; storing data back to memory from a register; or performing some type of arithmetic or logic operation, as determined by the translation routine.

Each routine is, for instance, implemented in software, which is stored in memory and executed by native central processing unit 37. In other examples, one or more of the routines or operations are implemented in firmware, hardware, software or some combination thereof. The registers of the emulated processor may be emulated using registers 45 of the native CPU or by using locations in memory 39. In embodiments, guest instructions 49, native instructions 55 and emulator code 47 may reside in the same memory or may be disbursed among different memory devices.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
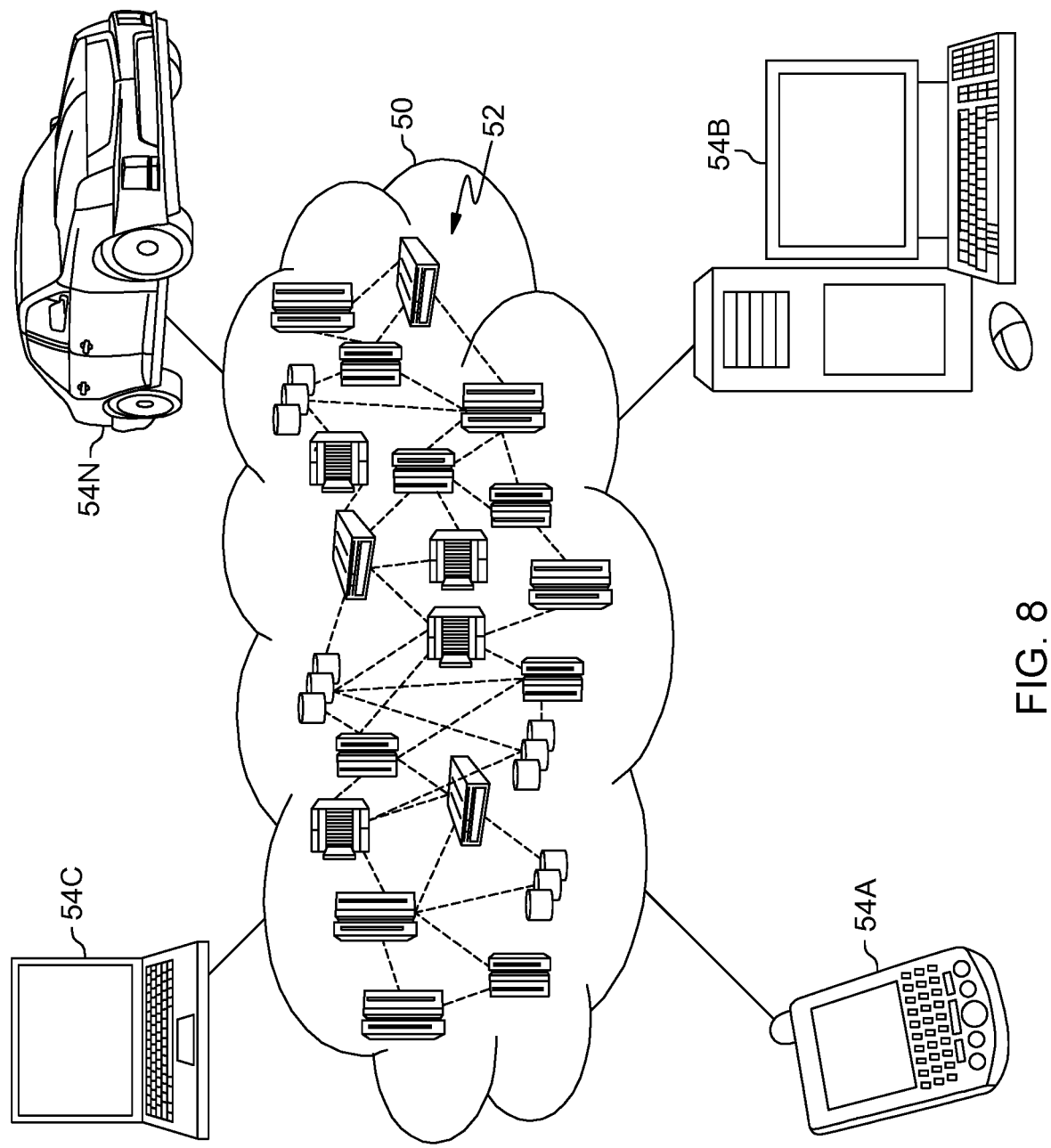
FIG. 8 depicts one embodiment of a cloud computing environment.

Referring now to FIG. 8, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 52 and cloud computing environment 50 can communicate with any type of computerized device over any type of network and/or network addressable connection (e.g., using a web browser).

Figure 9:
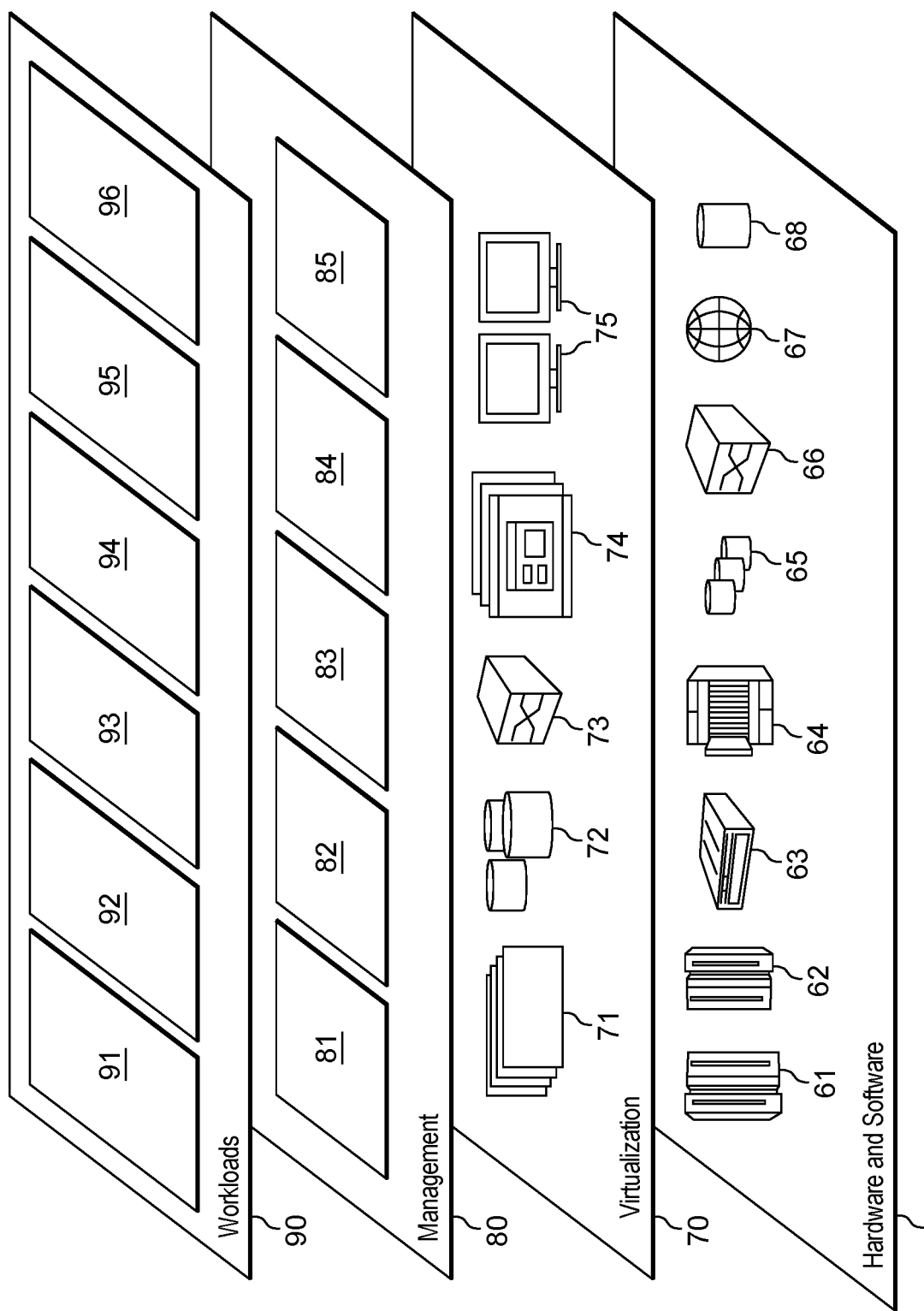
FIG. 9 depicts one example of abstraction model layers.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and reservation processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, other trusted components and/or security modules may be used. Additionally, other control blocks and/or indications of reservation may be used.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
at least one computer readable storage medium readable by at least one processing circuit and storing instructions for performing a method comprising:
reserving a security module for a secure guest of the computing environment, the security module being indicated in metadata used to start the secure guest, the metadata being cryptographically linked to a boot image of the secure guest, the reserving providing a reservation, and wherein the reserving comprises binding one or more queues used to communicate with the security module to the secure guest; and
managing the one or more queues based on one or more actions relating to the reservation.

2. The computer program product of claim 1, wherein the one or more actions comprises termination of the secure guest, and wherein the managing comprises deleting one or more pending requests from the one or more queues.

3. The computer program product of claim 1, wherein the one or more queues comprises at least one request queue, the one or more actions comprises an operation to submit a request to a request queue of the at least one request queue, and wherein the managing comprises confirming that the security module is reserved to the secure guest and permitting the operation based on confirming the security module is reserved to the secure guest and that the request was issued by the secure guest.

4. The computer program product of claim 1, wherein the one or more queues comprises at least one response queue, the one or more actions comprises an operation to fetch a response from a response queue of the at least one response queue, and wherein the managing comprises confirming that the security module is reserved to the secure guest and permitting the operation based on confirming the security module is reserved to the secure guest and that the operation to fetch was issued by the secure guest.

5. The computer program product of claim 1, wherein the one or more actions comprises losing access to the security module, and wherein the managing comprises flushing the one or more queues.

6. The computer program product of claim 5, wherein the method further comprises deleting pending requests to the security module, based on losing access to the security module.

7. The computer program product of claim 5, wherein the method further comprises deleting the reservation, based on losing access to the security module.

8. The computer program product of claim 1, wherein the method further comprises denying to send a request from the secure guest to a queue that is not reserved for the secure guest.

9. The computer program product of claim 1, wherein the method further comprises denying to pass a response to the secure guest that was fetched from a queue not reserved for the secure guest.

10. The computer program product of claim 1, wherein the method further comprises returning an error code to a guest, based on the guest attempting to access a queue that is not reserved for the guest.

11. The computer program product of claim 1, wherein the method further comprises determining whether the security module is in a list of accessible security modules included in the metadata used to start the secure guest, and wherein a process of reserving the security module continues, based on determining that the security module is in the list of accessible security modules included in the metadata.

12. The computer program product of claim 1, wherein the metadata is transmitted to a trusted component via a secure channel, the trusted component to perform the reserving.

13. The computer program product of claim 1, wherein the binding comprises including an indication of the reservation in a control block of a trusted component used in performing the reserving.

14. A computer system for facilitating processing within a computing environment, the computer system comprising:
a memory; and
a processor in communication with the memory, wherein the computer system is configured to perform a method, said method comprising:
reserving a security module for a secure guest of the computing environment, the security module being indicated in metadata to start the secure guest, the metadata being cryptographically linked to a boot image of the secure guest, the reserving providing a reservation, and wherein the reserving comprises binding one or more queues used to communicate with the security module to the secure guest; and
managing the one or more queues based on one or more actions relating to the reservation.

15. The computer system of claim 14, wherein the one or more actions comprises termination of the secure guest, and wherein the managing comprises deleting one or more pending requests from the one or more queues.

16. The computer system of claim 14, wherein the method further comprises determining whether the security module is in a list of accessible security modules included in the metadata used to start the secure guest, and wherein a process of reserving the security module continues, based on determining that the security module is in the list of accessible security modules included in the metadata.

17. The computer system of claim 14, wherein the method further comprises returning an error code to a guest, based on the guest attempting to access a queue that is not reserved for the guest.

18. A computer-implemented method of facilitating processing within a computing environment, the computer-implemented method comprising:

reserving a security module for a secure guest of the computing environment, the security module being indicated in metadata used to start the secure guest, the metadata being cryptographically linked to a boot image of the secure guest, the reserving providing a reservation, and wherein the reserving comprises binding one or more queues used to communicate with the security module to the secure guest; and managing the one or more queues based on one or more actions relating to the reservation.

19. The computer-implemented method of claim 18, wherein the one or more actions comprises termination of the secure guest, and wherein the managing comprises deleting one or more pending requests from the one or more queues.

20. The computer-implemented method of claim 18, further comprising determining whether the security module is in a list of accessible security modules included in the metadata used to start the secure guest, and wherein a process of reserving the security module continues, based on determining that the security module is in the list of accessible security modules included in the metadata.

* * * * *